US006369458B2

(12) United States Patent
Zintler et al.

(10) Patent No.: US 6,369,458 B2
(45) **Date of Patent: *Apr. 9, 2002**

(54) ELECTRONIC CENTRAL LOCKING SYSTEM

(75) Inventors: Albert Zintler, Gross-Gerau; Dieter Busch, Rosbach, both of (DE)

(73) Assignee: Mannesmann VDO AG, Frankfurt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,392

(22) Filed: May 20, 1999

(30) Foreign Application Priority Data

May 22, 1998 (DE) ........................................ 198 22 887

(51) Int. Cl.[7] ................................................ B60R 25/00

(52) U.S. Cl. ..................... 307/10.2; 307/10.1; 180/287; 340/5.2; 340/5.21; 340/5.22

(58) Field of Search .............................. 307/10.2, 10.1; 340/825.31, 825.3; 318/478; 180/287

(56) References Cited

U.S. PATENT DOCUMENTS

| | | | | | |
|---|---|---|---|---|---|
| 4,509,093 | A | * | 4/1985 | Stellberger | 340/825.31 |
| 5,349,459 | A | * | 9/1994 | Reed | 359/142 |
| 5,574,343 | A | * | 11/1996 | Leiber et al. | 318/478 |
| 5,744,875 | A | * | 4/1998 | Kleefeldt et al. | 307/10.2 |
| 5,874,785 | A | * | 2/1999 | Liu | 180/287 |

FOREIGN PATENT DOCUMENTS

| | | |
|---|---|---|
| DE | 3628706 | 2/1988 |
| DE | 4427253 | 2/1996 |
| DE | 19633202 | 9/1997 |
| DE | 19639896 | 4/1998 |

* cited by examiner

*Primary Examiner*—Albert W. Paladini
(74) *Attorney, Agent, or Firm*—Martin A. Farber

(57) ABSTRACT

The security to prevent theft of a central locking system for motor vehicles is improved by arranging a switch 34, 340, which can be switched by a coded signal, in the supply voltage lines 31 and/or 310 and/or 32 for driving an-actuating element.

12 Claims, 3 Drawing Sheets

ELECTRONIC CENTRAL LOCKING SYSTEM

FIELD AND BACKGROUND OF THE INVENTION

The invention relates to an electronic central locking system for motor vehicles and operating systems for locks or the like whose actuating elements are connected, such that they can be switched, via supply voltage lines to a controller.

In a known central locking system for motor vehicles, operating points which are designed as infrared receivers or else as receivers for other wire-free signals are constructed on the doors, on the trunk lid and in the vicinity of the starter switch as well as on the filler cap lock.

These operating points are all the same in the known central locking system. Each operating point comprises a transmitting device which includes a modulator, an amplifier and an IR diode, and a receiving device having a photo diode, an amplifier and a demodulator. Each of these operating points is connected via in each case two supply voltage lines to a controller, which essentially comprises a microcomputer and an interface circuit (DE-A 36 28 706 A1).

It is disadvantageous that this known central locking system is not thief-proof since the actuating elements can be changed to the "open" position by applying external voltages to the supply voltage lines.

SUMMARY OF THE INVENTION

In contrast to this, the invention is based on the object of improving a central locking system of the described type such that it is thief-proof.

It has been found that this object can be achieved in a simple manner by arranging a switch, which can be switched by coded signal, in the supply voltage lines for driving an actuating element.

According to a feature of the invention, the switch which can be switched by the coded signal is arranged in the immediate vicinity of the drive for an actuating element.

This means that application of an external voltage to a supply voltage line cannot operate the drive for an actuating element, since the supply voltage line is interrupted by the switch immediately upstream of the drive. The actuating element cannot be influenced until the switch in the supply voltage line has been closed by the correct coded signal.

The coded signals for the switches can reach said switches via signal lines which are arranged between the controller and the switches.

According to another feature of the invention, the coded signals can alternatively be transmitted to a switch via the supply voltage line for the drive for the actuating element.

It is advantageous if, according to still another feature of the invention, the drive for an actuating element, the switch and the switching electronics are combined to form a unit. An economic and simple circuit is provided by using the voltage supply for the unit both for supplying the switching electronics and for supplying the drive for the actuating element.

In a second exemplary embodiment, the drives for the actuating elements are driven by data signals which pass via dedicated data lines to the switches and to the switching electronics in order to drive the drives for the actuating elements.

According to other features of the invention, pulse modulation or amplitude modulation can be mused to apply the coded signals to the supply voltages.

In order to improve the security to prevent theft, the voltage supply lines and/or the signal and data lines are laid in a concealed manner.

BRIEF DESCRIPTION OF THE DRAWINGS

Exemplary embodiments of the invention are explained in the following text with reference to the drawings.

DETAILED DESCRIPTION OF THE PREFERRED EMBODIMENTS

Figure 1:
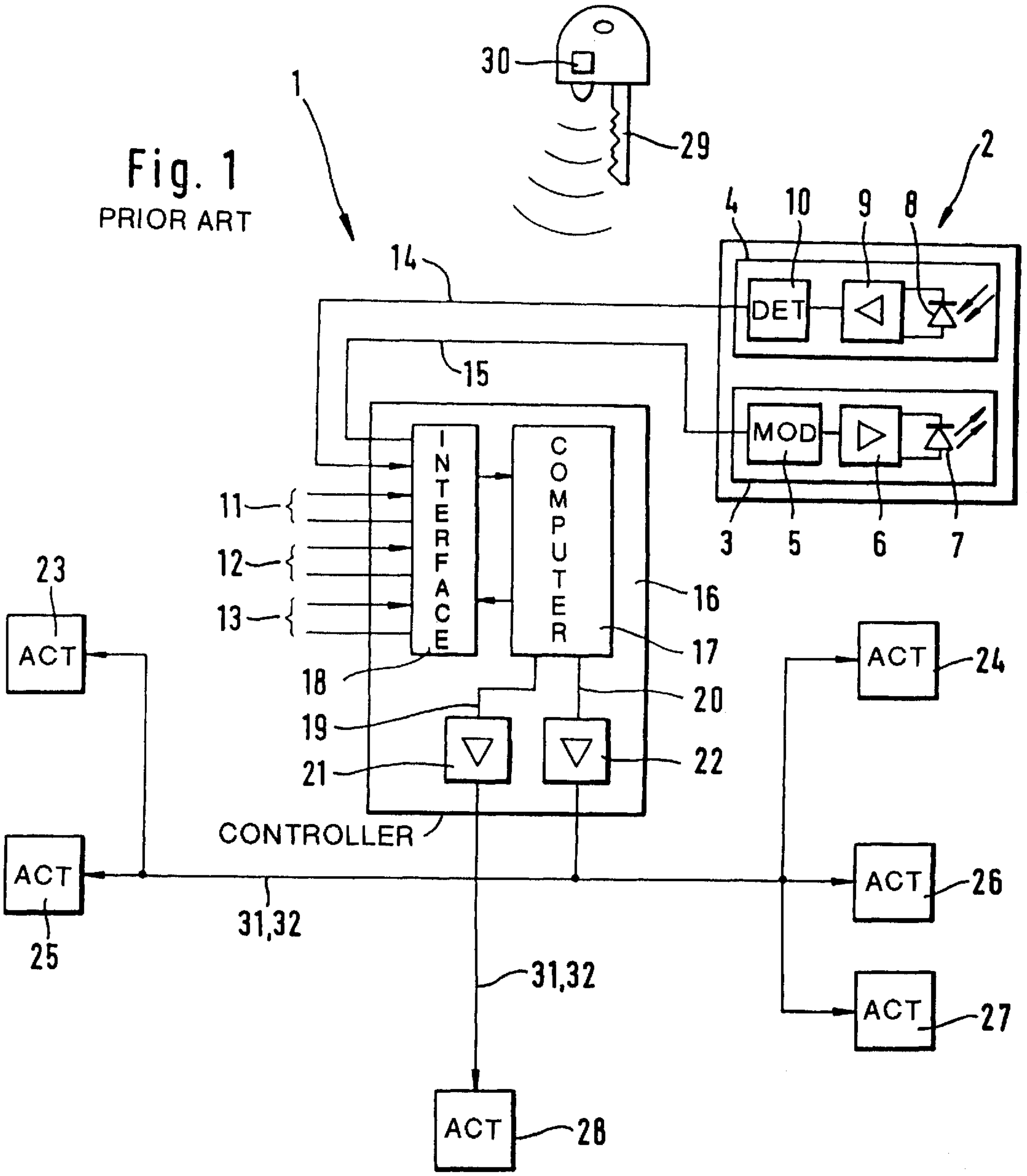
Fig. 1 PRIOR ART
FIG. 1 shows, schematically, major elements of a known central locking system.

In a known electronic central locking system 1, a plurality of identical operating points 2, 11, 12 and 13 are provided of which, for the sake of simplicity, only the operating point 2 will be explained in more detail. This includes a transmitting device 3 and a receiving device 4. The transmitting device 3 includes a modulator 5, an amplifier 6 as well an IR diode 7. The receiving apparatus 4 includes a photo diode 8, an amplifier 9 as well as a demodulator 10.

Each of the operating points 2, 11, 12 and 13 is connected via lines 14 and 15 to a controller 16, which includes a microcomputer 17 and an interface circuit 18.

Actuating elements are supplied via supply voltage lines 31 and 32, via outputs 19 and 20 as well as power stages 21 and 22. By way of example, an actuating element 23 is used for the driver's door, an actuating element 24 for the front-passenger's door, an actuating element 25 for one rear door, an actuating element 26 for the other rear door, an actuating element 27 for a filling lock, and an actuating element 28 for a trunk.

A key 29, which includes a code transmitter 30, is provided to operate the central locking system 1. The transmitter and the receivers for the central locking system 1 may operate by radio, or else by infrared signals.

When the signals emitted by the code transmitter 30 arrive at a receiving device 4, then this, via the interface circuit 18, emits an appropriate signal to the microcomputer 17. The interface circuit 18 adds to this signal information about which receiving device 4 received the signals. The program which is stored in the microcomputer 17 uses this information to determine information items which operate the actuating element 23 to 28. For example, when the wire-free signals are received at the operating points 2 and 11, all the doors and the filler cap are unlocked. When the IR signals are received at another operating point, the doors, the filler cap and the trunk lid are unlocked. When wire-free signals are received at the last operating point, close to the starter switch, only the trunk lid is unlocked.

FIG. 1 shows that the supply voltage lines 31 and 32 are routed directly to the actuating elements 23 to 28. It can be seen that, under some circumstances, the actuating elements can be moved to the "open" position by applying external voltages to the supply voltage lines 31, 32.

Figure 2:
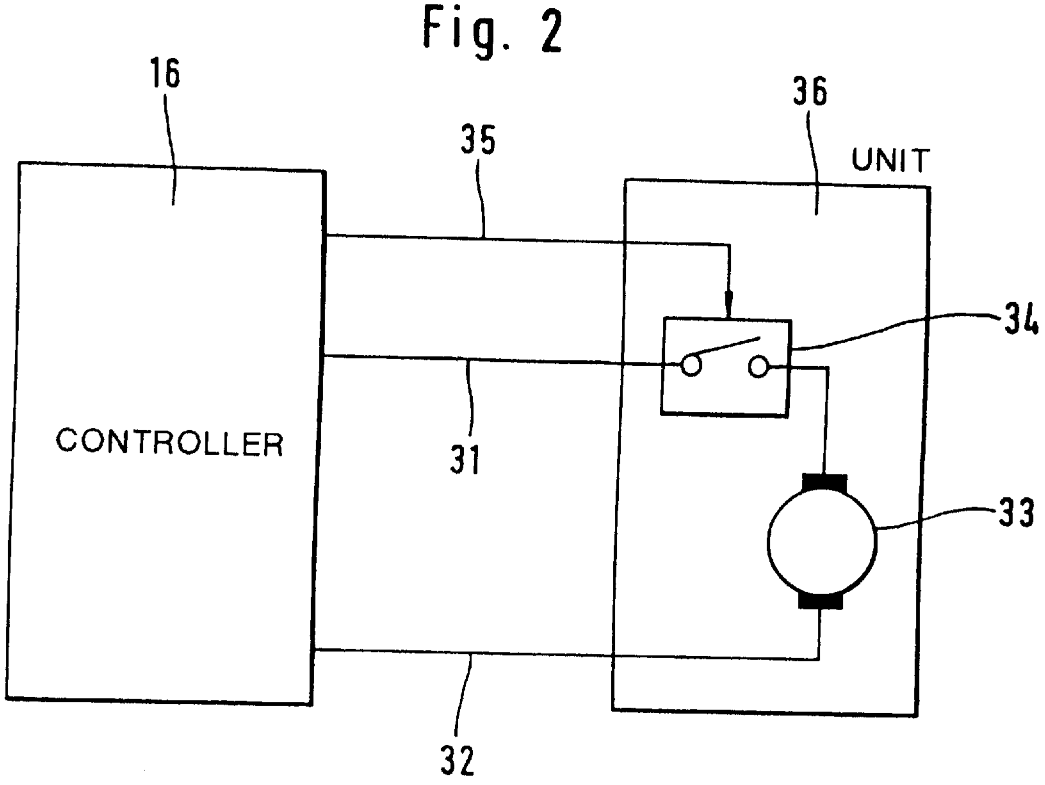
FIG. 2 shows an outline circuit diagram of a first embodiment of the invention.
Figure 3:
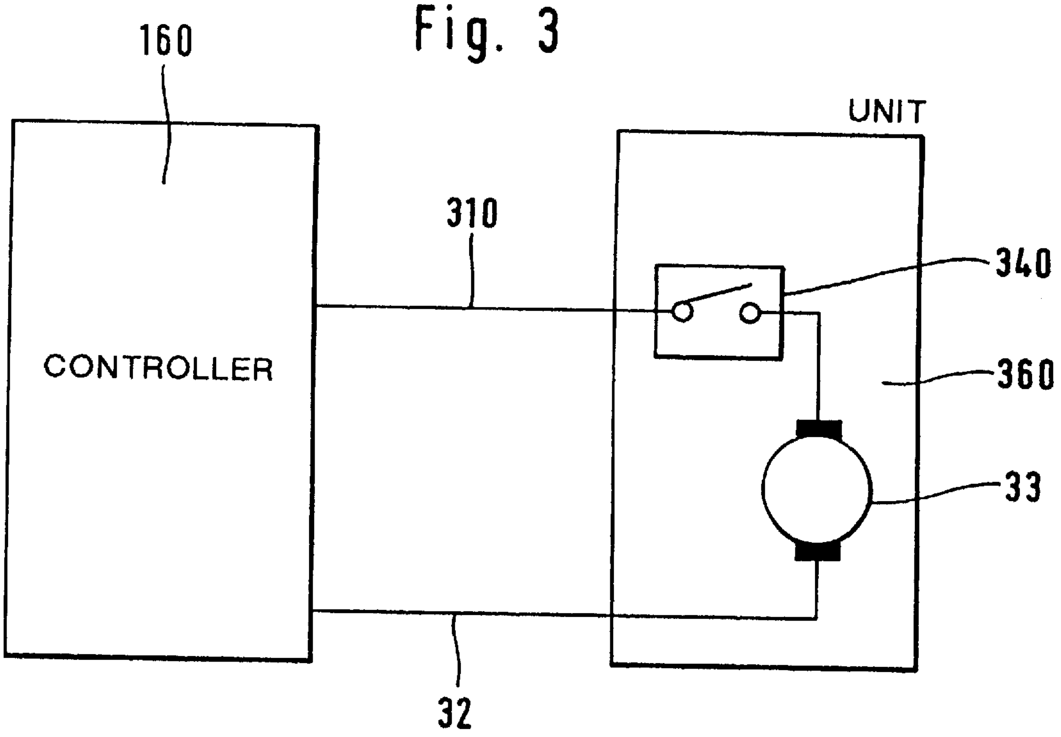
FIG. 3 shows an outline circuit diagram of a second exemplary embodiment of the invention.

FIGS. 2 and 3 show, schematically, how this can be avoided according to the invention.

In a first exemplary embodiment according to FIG. 2, the controller 16 is connected via power supply lines 31 and 32 and via a switch 34 to the drive 33 for an actuating element. The switch 34 is furthermore connected, such that it can be switched, via a signal line 35 to the controller 16. The drive 33 for an actuating element and the switch 34 are combined to form a unit 36.

This circuit arrangement can be used to switch on the drive 33 for one of the actuating elements, via the power supply lines 31 and 32, only if the switch 34 has previously been closed by a coded signal via the signal line 35. This coded signal is emitted from the controller 16.

FIG. 3 shows a second exemplary embodiment with a controller 160, which is connected via a supply voltage line 310 and a supply voltage line 32 to a switch 340. This switch 340 is located in the circuit for the drive 33 for an actuating element, and is combined with this drive 33 to form a unit 360. The switch 340 is switched via coded signals, which are passed to the switch 340 via the supply voltage line 310.

Figure 4:
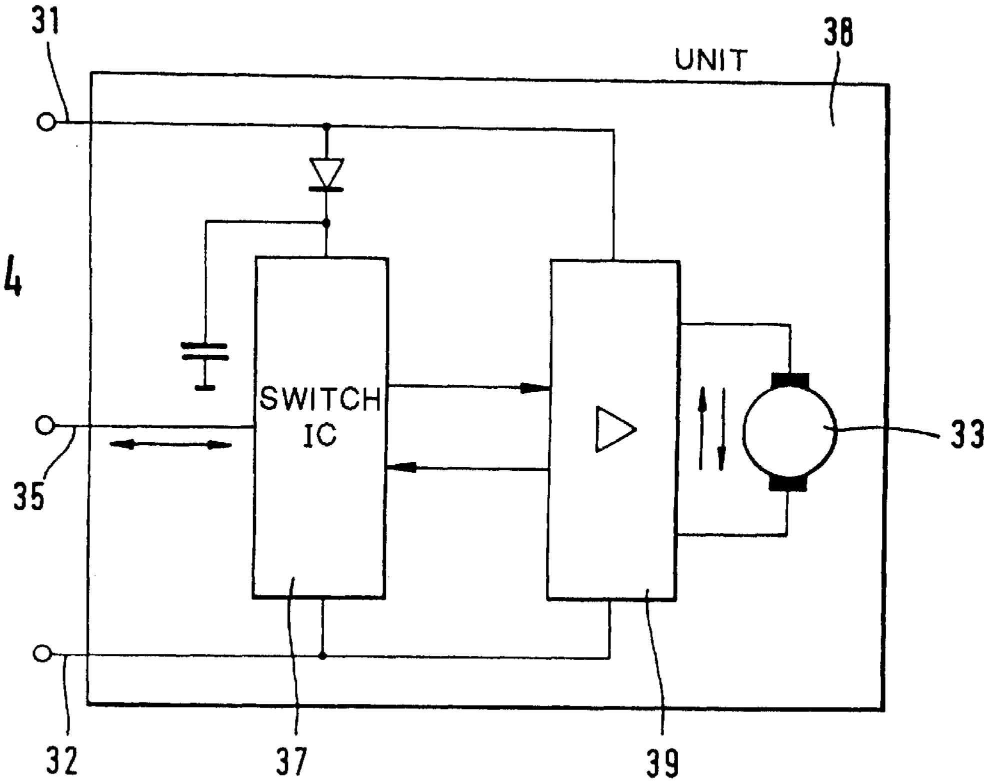
FIG. 4 shows a more detailed illustration of the first exemplary embodiment.

FIG. 4 shows the circuit arrangement according to FIG. 2, in detail. On a unit 38, the drive 33 for an actuating element is directly connected to control electronics comprising a power stage 39 and a switching IC 37. The switching electronics are connected via supply voltage lines 31 and 32 to the controller 16. The supply voltage lines 31 and 32 also supply voltage to the drive 33.

The drive 33 is driven via an appropriate data signal (unidirectional or bi-directional data interchange) via the signal line 35.

Figure 5:
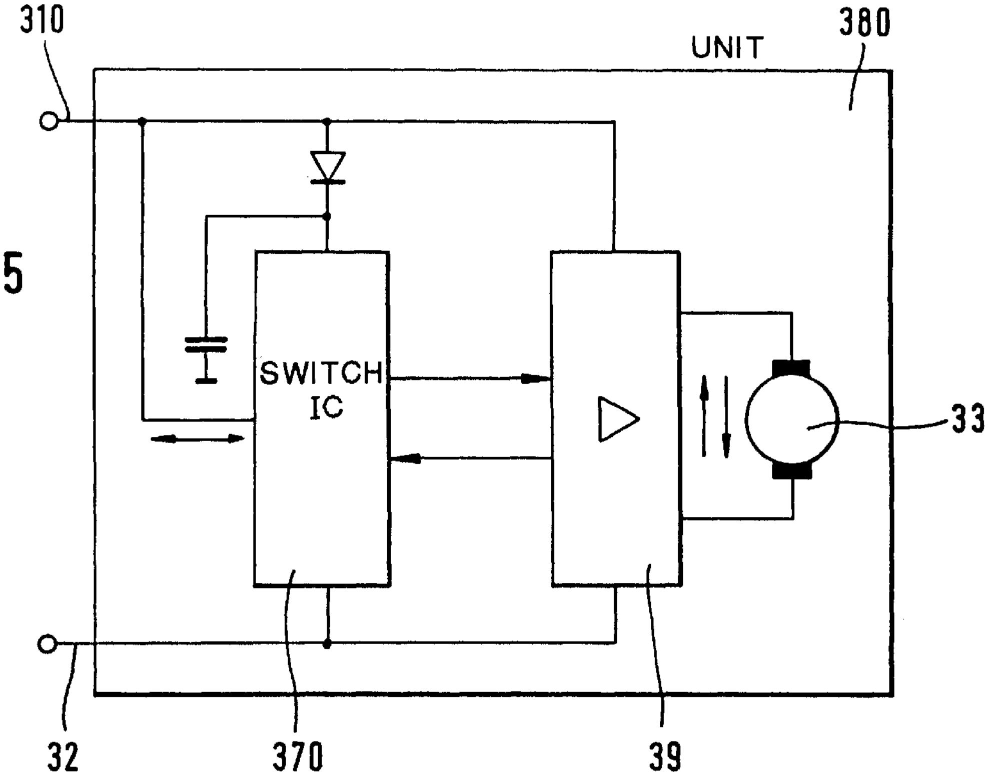
FIG. 5 shows a more detailed illustration of the second exemplary embodiment.

According to FIG. 5, a drive 33 for an actuating element, a power stage 39 and a switching IC 370 are combined to form a unit 380. The switching IC 370 is connected to the controller 16 via a voltage supply line 32 and via a further voltage supply lines 310. Coded signals are passed via the voltage supply line 310 to the switching IC 370, and cause the drive 33 to be switched.

The signals are applied to the supply voltage lines by, for example, amplitude modulation or pulse modulation.

The units 36, 360 and 38, 380 are used, according to the invention, instead of the actuating elements 23 to 28 in an electronic central locking system 1 as shown in FIG. 1. In consequence, it is no longer possible to operate these actuating elements simply by connecting the supply voltage lines to external voltages.

LIST OF DESIGNATIONS USED

1 Electronic central locking system
2 Operating point
3 Transmitting device
4 Receiving device
5 Modulator
6 Amplifier
7 IR Diode
8 Photo diode
9 Amplifier
10 Demodulator
11 Operating point
12 Operating point
13 Operating point
14 Line
15 Line
16 Controller
160 Controller
17 Microcomputer
18 Interface circuit
19 Output
20 Output
21 Power stage
22 Power stage
23 Actuating element, driver's door
24 Actuating element, front-passenger's door
25 Actuating element, rear door
26 Actuating element, rear door
27 Actuating element, filler cap lock
28 Actuating element, trunk
29 Key
30 Coded transmitter
31 Supply voltage line
310 Supply voltage line with signal transmission
32 Supply voltage line
33 Drive for an actuating element
34 Switch
340 Switch
35 Signal line
36 Unit
360 Unit
37 Switching IC
370 Switching IC
38 Unit
380 Unit
39 Power stage

We claim:

1. An electronic central locking system (1) for motor vehicles and operating systems for locks or the like, the system comprising:

a plurality of actuating elements for actuating respective ones of the locks;

a controller for operating the actuating elements and supply voltage lines interconnecting the controller with respective ones of the actuating elements for powering the actuating elements;

a plurality of switches connected to respective ones of the actuating elements, each switch being serially connected between its actuating element and a respective one of the supply voltage lines for applying voltage of the line to the actuating element, each of the actuating elements with its switch constituting a single unit, and each of the switches being operative in response to a code; and means within the controller for providing a code to activate each switch of the plurality of switches to conduct electric power to the switch from its respective supply voltage line;

wherein, in order to drive an actuating element (23–28), the supply voltage lines (31, 310, 32) are switched by a respective one of the switches (34, 340, 37, 370) by application of a coded signal to the switch.

2. The central locking system as claimed in claim 1, distinguished by signal lines (35) which are connected to the controller (16, 160), via which the coded signals are supplied to the switches (34, 37).

3. The central locking system as claimed in claim 1, wherein each of the actuating elements includes a drive, and wherein the switch (34, 340, 37, 370) which is switched by the coded signal is arranged in the immediate vicinity of the drive (33) of the respective actuating element (23–28).

4. The central locking system as claimed in claim 3, wherein a supply voltage line (310) for the drive (33) for an actuating element (23–28) is used to transmit the coded signals to a switch (340, 370).

5. The central locking system as claimed in claim 3, wherein the drive (33) for an actuating element (23–28), the switch (34) and switching electronics (340, 37, 370, 39) are combined to form said unit (36, 360, 38, 380).

6. The central locking system as claimed in claim 5, wherein the supply voltage for the unit (36, 360, 38, 380) is used both for supplying the switching electronics (340, 37, 370, 39) and for supplying the drive (33) for the actuating element (23–28).

7. The central locking system as claimed in claim 5, wherein the drive (33) for an actuating element (23–28) is driven by data signals, which are connected via data lines (35) to the switches (34) and/or to the switching electronics (340, 37, 370, 39).

8. The central locking system as claimed in claim 7, wherein the supply voltage lines (31, 310, 32) and the signal and/or data lines (35) are laid in a concealed manner.

9. The central locking system as claimed in claim 5, wherein the drive (33) is driven by signals which are coded for a switching element (23–28) and are supplied to the switches (34) and/or the switching electronics (340, 37, 370, 39) via supply voltage lines (31, 310, 32).

10. The central locking system as claimed in claim 9, wherein amplitude modulation is used to apply the coded signals to the supply voltages.

11. The central locking system as claimed in claim 9, wherein pulse modulation is used to apply the coded signals to the supply voltages.

12. An electronic central locking system (1) for motor vehicles and operating systems for locks or the like, the system comprising:

a plurality of actuating elements for actuating respective ones of the locks;

a controller for operating the actuating elements and supply voltage lines interconnecting the controller with respective ones of the actuating elements for powering the actuating elements;

a plurality of switches connected to respective ones of the actuating elements, each switch being serially connected between its actuating element and a respective one of the supply voltage lines for applying voltage of the line to the actuating element, each of the actuating elements with its switch constituting a single unit, and each of the switches being operative in response to a code; and means within the controller for providing a code to activate each switch of the plurality of switches to conduct electric power to the switch from its respective supply voltage line; and wherein pulse modulation is used by the code-providing means to apply the coded signal to a switch to supply voltage to an actuating element.

* * * * *